United States Patent Office 2,901,114
Patented Aug. 25, 1959

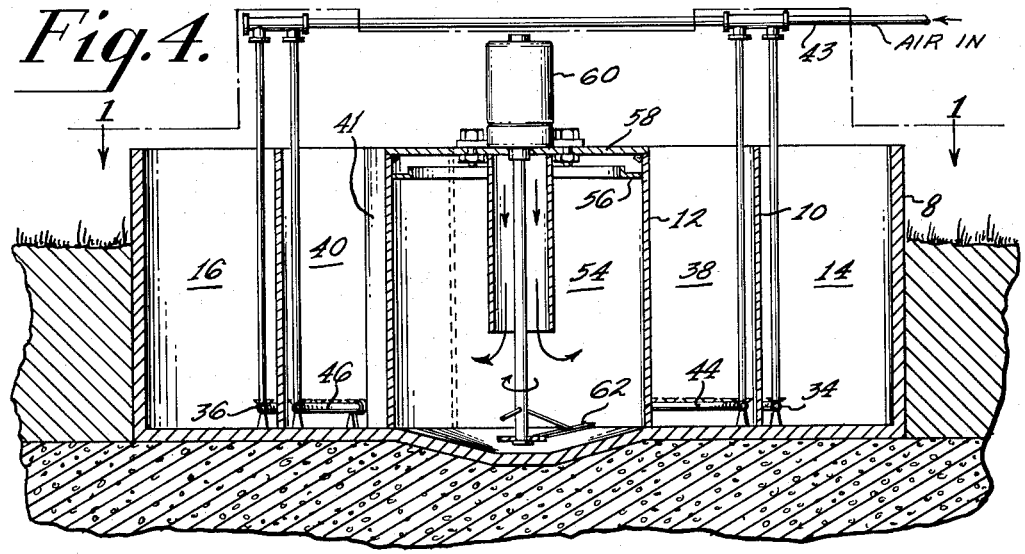
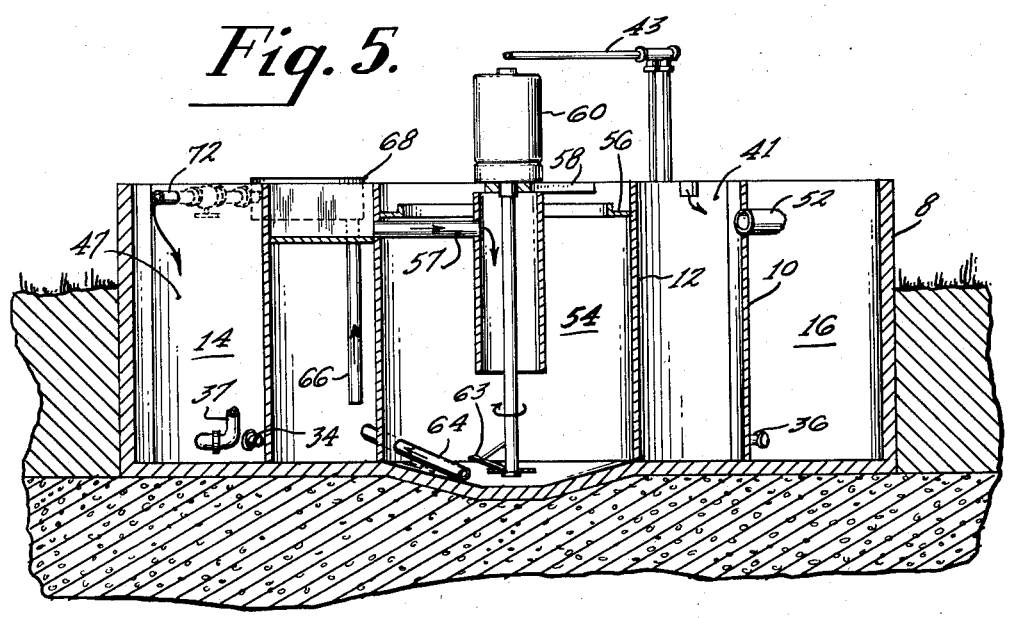

2,901,114

SEWAGE TREATMENT APPARATUS

Arnold R. Smith, Haddonfield, N.J., and Walter T. McPhee, Scarborough, N.Y.; said Smith assignor to said McPhee Application April 17, 1957, Serial No. 653,329

5 Claims. (Cl. 210—200)

This invention relates in general to novel apparatus for the treatment and purification of sewage, and in particular to improved and simplified apparatus for the treatment of sewage by the activated sludge process.

The activated sludge process consists of several steps. Generally, the raw sewage is first passed through a bar screen to remove large solids and then passes through a grinder or comminutor which reduces the remaining solid matter to a small size. The sewage then goes to a primary clarifier, which is generally a rectangular tank which holds the sewage for a length of time. This permits some of the larger heavier solids to settle to the bottom of the tank. The solids which settle are then usually raked to one end of the tank. The sewage then passes to another tank, which is called an aeration tank. This tank is also generally rectangular and is designed to hold the sewage for 6 to 8 hours. As the sewage enters this tank, it is mixed with part of the solid matter that has settled in a secondary clarifier, the function of which will be described hereinafter. While in the aeration tank, the sewage is constantly exposed to oxygen. From the aeration tanks the sewage passes to a final or secondary clarifier which retains the sewage for about 2 hours. While in the aeration tank, the solid and dissolved matter that had not settled in the primary clarifier is adsorbed and partly oxidized by masses of bacteria which form into clumps called floc. The floc settles out in the secondary or final clarifier leaving an effluent or end product.

About one-fourth of the settled floc in the secondary clarifier is returned to mix with the incoming sewage at the head of the aeration tank as previously described. The remainder of the floc and the material which settles out in the primary clarifier are then pumped to a separate structure known as a digester. The digester is usually a separate tank which receives the solid matter removed from the sewage, which is known as sludge. The sludge is usually allowed to remain in the digester for at least 30 days, during which time it undergoes a process of decomposition and is reduced in volume by about fifty percent. When it is fully digested, the sludge is dewatered by allowing it to drain on sand beds or by mechanical means such as a vacuum filter.

Many modifications of the above process and the apparatus for performing the process have been suggested in the past. All of these require, however, at least two units for performing the clarification, aeration, and digestion functions. Accordingly, the costs of material and construction are relatively high. Furthermore, a relatively large area of land is needed to accommodate the various units, which is uneconomical. In addition, the prior art apparatus for performing this process requires the use of extensive piping and considerable apparatus is needed to pump the sewage from one unit to the other.

It is, accordingly, an object of this invention to provide improved and unitary apparatus for treating sewage by the activated sludge process.

It is another object of this invention to provide improved apparatus for treating sewage by the activated sludge process wherein savings in construction, material, and land costs are realized.

It is yet another object of the present invention to provide improved apparatus for the treatment of sewage wherein the various functions of the activated sludge process may be combined in a single, economical, and unitary structure.

It is still another object of this invention to provide improved and novel means for treating and purifying sewage wherein piping and pumping are reduced to a minimum.

Sewage treatment apparatus embodying the invention basically comprises three cylindrical and concentric tanks which are arranged with respect to each other to perform the aeration, stabilization, clarification, and digestion functions in a single unitary structure. The outermost tank is divided into three sections in which the digestion function is performed and, in addition, chlorine is added to the effluent liquid. The middle tank is used to perform the aeration functions. Finally, the innermost tank is used for clarification. By this novel arrangement and structure, the complete treatment of sewage is accomplished with apparatus which is economical to construct and operate and which provides considerable savings in space.

The novel features that are considered characteristic of this invention are set forth with particularity in the appended claims. The invention itself, however, both as to its organization and method of operation, as well as additional objects and advantages thereof, will best be understood from the following description when read in connection with the accompanying drawing, in which:

Figure 4 is a vertical-sectional view taken along the line 4—4 of Figure 3; and

Figure 5 is a vertical-sectional view taken along the line 5—5 of Figure 3.

Figure 1:
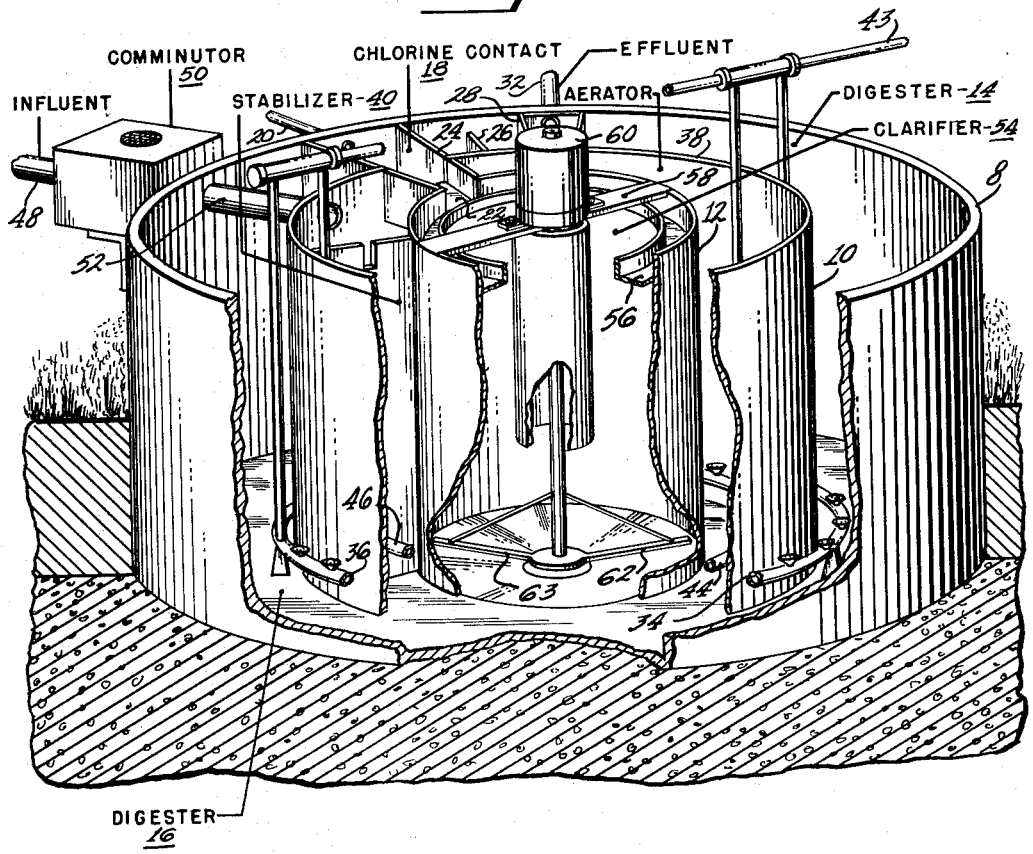
Figure 1 is a view in perspective, which has been partially broken away, of sewage treatment apparatus embodying the present invention.
Figure 2:
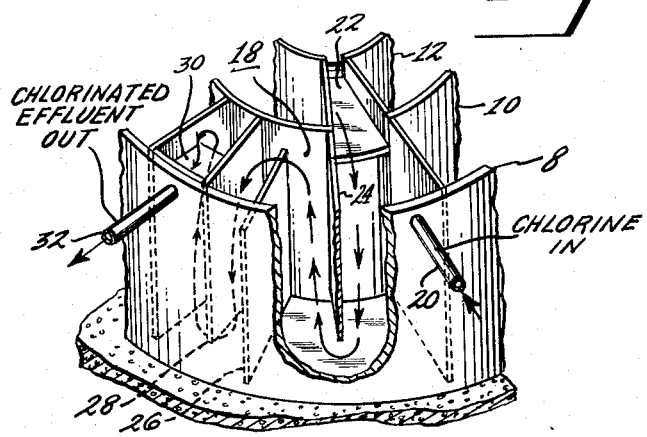
Figure 2 is a view in perspective, which has been partially broken away, of the chlorine contact portion of the apparatus illustrated in Figure 1.
Figure 3:
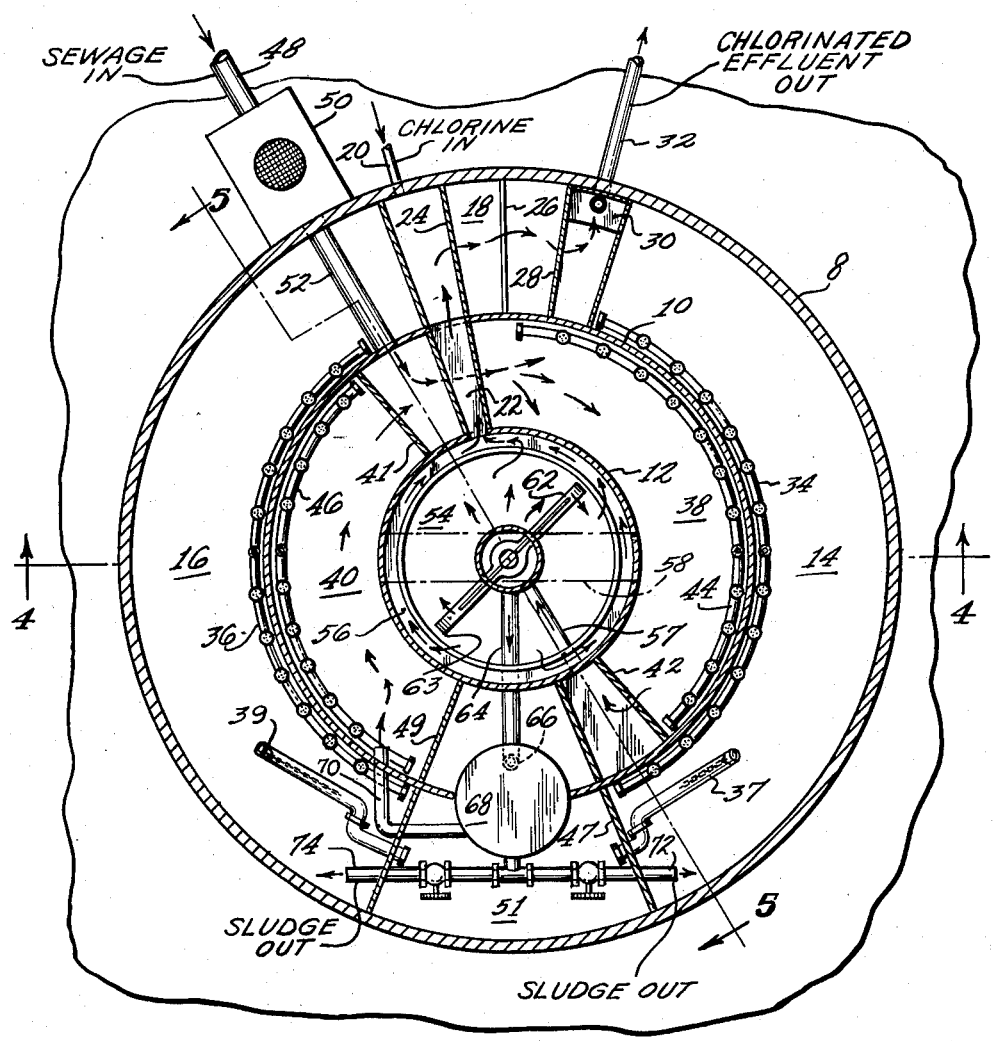
Figure 3 is a plan view of sewage treatment apparatus of the type illustrated in Figure 1.

Referring now to the drawing, wherein like parts are indicated by like reference numerals throughout the several figures, sewage treatment apparatus embodying the present invention comprises three cylindrical and concentric tanks. The concentric tank walls are identified in the drawing as an outer wall 8, a middle wall 10 and an inner wall 12. The tank walls are preferably, but not necessarily, constructed of steel. As will be seen most clearly from a consideration of Figure 3, the volume situated between the outer wall 8 and the middle wall 10 is divided into three principal sections or chambers. Two of these sections, the sections 14 and 16 are digesters. They are separated by a third section 18 which is a chlorine contact chamber, the details of which are illustrated most clearly in Figure 2 of the drawing. Chlorine is added to the chlorine contact chamber 18 by means of an inlet pipe 20. The chlorine contact chamber comprises a series of baffles, which in the present example have been chosen to be three in number, and are identified as the baffles 24, 26, and 28. Fluid which has been otherwise processed by the apparatus passes through a trough 22 to the chlorine chamber 18. This fluid passes under the baffle 24, over the second baffle 26, and finally under the baffle 28. In this way, the fluid passing into the chlorine contact chamber 18 is throughly mixed with the chlorine.

The chlorinated effluent flows over a weir 30 and through an outlet pipe 32 to a stream or other discharge point conveniently located with respect to the sewage processing apparatus.

Each of the digestion chambers 14 and 16 has an air diffuser pipe which is located near the inner wall of the chambers and extending along the periphery of the respective chambers. These diffuser pipes 34 and 36 impart a rolling motion to the fluid contents of the digestion chambers 14 and 16, respectively, as air is released into each of these chambers. Each of the digester sections 14 and 16 is also equipped with a swing line 37 and 39, respectively, each of which serves to remove liquid from these sections at any desired level above the solid matter which will be deposited on the bottom of the digesters. The volume situated between the middle tank wall 10 and the inner tank wall 12 is divided into two principal sections or chambers. One of these, the section adjacent the digester 14, is an aerator 38 or aeration chamber. The other chamber, that is the chamber which is located adjacent the other digester 16, is a stabilizer 40 or stabilization chamber. The aerator 38 and the stabilizer 40 are separated by a weir 41, while the opposite end of the aerator 38 is terminated by a weir 42. The aerator 38 and stabilizer 40 are each equipped with an air diffuser pipe 44 and 46, respectively, which are supplied air from the same supply or source 43 as the digester air diffuser pipes 34 and 36. The ends of the aerator 38 and stabilizer 40, as well as the digesters 14 and 16 are terminated by walls 47 and 49 which extend from the outside wall of the inner tank wall 12 to the outer tank wall 8 and are the same height as the tanks. The space 51 bounded by the walls 47 and 49 and the tank walls 8 and 10 would be used for dewatering the tanks and for the collection of scum.

The aerator section 38 receives the influent raw sewage, which enters the apparatus through an influent pipe 48 which is connected with a comminutor 50. The comminutor is connected through a pipe 52 to the aerator section 38. Thus the raw sewage, after comminution, passes directly to the aerator tank 38 or chamber.

The volume inside the inner tank wall 12 comprises the clarifier section or chamber 54. A weir 56, which takes the form of a trench or trough, is situated along the upper periphery of the clarifier section. This trench has an opening into the trough 22 which serves to deposit the processed liquid into the chlorine contact chamber 18. A pipe 57 extends from a well in the center of the clarifier 54 to a point just adjacent the weir 42 at the end of the aerator 38. A beam 58 spans the diameter of and is supported by the clarifier tank 12. A motor 60 is mounted on the beam 58. The motor 60 serves to slowly rotate two arms 62 and 63 or rakes which rotate near the bottom of the clarifier 54. These arms 62 and 63 rake the solid matter which settles to the bottom of the clarifier 54 to the center of the clarifier.

A pipe 64 extends from the center of the clarifier 54 through the tank wall 12. A second pipe 66 is connected from a point near one end of the pipe 64 to a distribution box 68. This is shown most clearly in Figure 5. The solid matter deposited on the bottom of the clarifier 12 is lifted by an air pump or lift through the pipes 64 and 66 to the distribution box 68. Air for the air pump or lift may be conveniently supplied from the air diffuser pipe supply 43. Three outlet pipes are provided on the distribution box 68. One of these, the pipe 70 enters into the stabilizer. A second, the pipe 72 enters into one digester section 14. The final pipe 74 enters the other digester 16 (see Figure 3).

Raw sewage enters the sewage treatment apparatus embodying the invention through the influent pipe 48, which is attached to the comminutor 50. The comminutor 50 may be of any well known type and serves to grind the solid matter present in the raw sewage into small particles. The sewage then leaves the comminutor 50 and flows through the pipe 52 into one end of the aeration tank or chamber 38. At this point, the incoming sewage is mixed with stabilized sludge, which flows over the weir 41 at the end of the stabilization chamber 40 into the aerator 38. (The origin of the stabilized sludge will be described in more detail hereinafter.)

The raw sewage, which is mixed with the stabilized sludge passes to the other end of the aerator 38 after approximately 30 minutes time. During this time, the raw sewage and sludge undergo the usual chemical and bacteriological processes which convert most of the solids in the sewage into liquids and activated sludge. While in the aerator 38, the solid matter in the sewage is absorbed and partly oxidized by masses of bacteria in a well known manner. The bacteria form into clumps of solid matter which are referred to as floc or as activated sludge. Compressed air, which is blown through the air diffuser pipe 44, rises through the fluid in the aerator 38 with sufficient velocity to impart a rolling motion to the sewage.

The sewage, after being detained in the aerator, passes over the weir 42 at the other end of the aerator 38. The sewage then flows through the pipe 57 into the cylindrical center wall of the clarifier 54. The sewage flows down under this center wall and out into the main body of the clarifier 54.

During the aeration period, stabilized sludge is mixed with the raw sewage. The sludge adsorbs the putrescible matter in the sewage. When the aerated sewage passes into the clarifier 54, the velocity is so reduced that the solid matter, or floc, settles to the bottom of the clarifier 54 and the remaining clear fluid moves to the top and over the effluent weir 56. The clear fluid travels around the periphery of the weir 56 and flows through the trough 22 to the chlorine contact chamber 18. The effluent then travels the length of the chlorine contact chamber 18 and is thoroughly mixed with the chlorine which is added through the pipe 20 by means of the baffles 24, 26, and 28. The liquid passes under the baffle 24, over the baffle 26 and then under the baffle 28. The chlorinated effluent then flows over the effluent weir 30 and then out of the apparatus through the effluent pipe 32.

Meanwhile, the solid matter, or sludge, in the clarifier 54 has settled to the bottom of the clarifier 54. It is raked by the two slow moving arms 62 and 63 which are rotated by the motor 60, which is supported on the beam 58 spanning the clarifier. The sludge is raked to the center of the clarifier 54, from which it is lifted by an air pump or lift through the pipes 64 and 66 to the distribution box 68. The distribution box 68 serves to divide the sludge so that approximately one-fourth goes to the stabilizer 40 through the pipe 70, while the remainder goes to one digester 16 through the pipe 74 or to the other digester 14 through the pipe 72.

The stabilizer 40, as described hereinbefore, is equipped with an air diffuser pipe 46 which is located along the entire length of the stabilizer. Air blown through these diffusers causes the contents of the stabilizer 40 to rotate and to be brought into intimate contact with air. The sludge is retained in the stabilizer 40 for about 3 hours. During this period, the bacteria have had an opportunity to digest the matter adsorbed in the aeration tank 38. When the sludge reaches the other end of the stabilization tank 40, it passes over the weir 41 into the end of the aeration tank 38 when it is mixed with the incoming raw sewage, as previously described. The process then starts over again.

The excess sludge, i.e., the three-fourths that has been removed by the clarifier and discharged into the digesters 14 and 16, is undergoing further chemical and biological treatment in the digesters. As in the aeration and stabilization tanks, air, which is released through the air diffuser pipes 34 and 36, imparts a rolling motion to the fluid contents. The digesters are of sufficient volume to enable the raw sludge to be in contact with air for at least 10 days. At the end of this period, the sludge has been reduced in volume and becomes non-putrescible. Space is also provided in the digesters for digested sludge storage for whatever period is required by the requirements of local or state ordinances and statutes.

The digested sludge can be removed from the digesters 14 and 16 by stopping the flow of air and allowing the sludge to settle to the bottom, and then pumping the sludge either by an air pump or some mechanical means to some known type of drying apparatus.

It should be understood that the materials used are not critical. While steel tanks are preferred, concrete tanks could be used. In addition, the bases for the tanks could be either steel or concrete.

In addition to the sludge drying facilities, a small control building having space for air blowers and a chlorinator is the only other equipment needed for a complete practice of apparatus embodying the invention. Accordingly, sewage treatment apparatus embodying this invention provides economy of space as well as of construction. Since only a single unit, comprising three concentric tanks, is required for the complete and effective treatment of sewage, substantial savings in construction, material, and land costs are realized. Moreover, the relation of the concentric tanks is such that there is a minimum amount of piping and of pumping between the various units. Any pumping that has to be done can be performed with an air pump which may use the same air supply that supplies air for the various processes. Accordingly, sewage treatment apparatus embodying the invention is characterized by substantial advantages compared with known prior art apparatus.

What is claimed is:

1. Apparatus for treating sewage comprising, in combination, at least a first, a second, and a third substantially cylindrical tank, said tanks being arranged substantially concentrically around a common axis to provide a single unitary structure for the complete treatment of sewage by the activated sludge process, means dividing the volume of said first tank into a pair of digestion chambers and a chlorine contact chamber, means dividing the volume of said second tank into a stabilization chamber and an aeration chamber, the volume of said third tank providing a clarification chamber, means for supplying influent sewage to said aeration chamber, means for discharging aerated sewage from said aeration chamber to said clarification chamber, means for discharging clarified liquid from said clarification chamber into said chlorine contact chamber, means for discharging chlorinated effluent liquid from said chlorine chamber, means for removing settled solids from said clarification chamber, means for distributing and discharging said solids into said digestion chambers and said stabilization chamber, and means for discharging matter from said stabilization chamber into said aeration chamber for mixing with said influent sewage.

2. Apparatus for treating sewage as defined in claim 1 wherein air is diffused through the contents of said digestion, said stabilization, and said aeration chambers.

3. Apparatus for treating sewage comprising, in combination, an outermost, a middle, and an innermost cylindrical tank, said tanks being arranged concentrically around a common axis to provide a single unitary structure for the complete treatment of sewage by the activated sludge process, means dividing the volume of said outermost tank into a pair of digestion chambers separated by a chlorine contact chamber comprising a series of baffles, means dividing the volume of said middle tank into a stabilization chamber and an aeration chamber, the volume of said innermost tank providing a clarification chamber, a first weir supported on the upper periphery of said clarification chamber, means for supplying influent sewage to said aeration chamber, means including a second weir for discharging aerated sewage from said aeration chamber after retention therein for a predetermined period of time to said clarification chamber, means including said first weir for discharging clarified liquid from said clarification chamber into said chlorine contact chamber, means for discharging chlorinated effluent liquid from said chlorine chamber, means for removing settled solids from said clarification chamber, means including a distribution box for distributing and discharging said solids into said digestion chambers and said stabilization chamber, and means for discharging solid matter from said stabilization chamber into said aeration chamber for mixing with said influent sewage.

4. Apparatus for treating sewage comprising, in combination, an outermost, a middle, and an innermost cylindrical tank, said tanks being arranged concentrically around a common axis to provide a single unitary structure for the complete treatment of sewage by the activated sludge process, means dividing the volume of said outermost tank into three chambers, two of said chambers being digestion chambers and the third of said chambers being a chlorine contact chamber, means dividing the volume of said middle tank into a stabilization chamber and an aeration chamber, the volume of said innermost tank providing a clarification chamber, means for supplying influent sewage to said aeration chamber, said aeration chamber retaining said influent sewage for a predetermined period of time, means for discharging aerated sewage from said aeration chamber to said clarification chamber, solid matter in said aerated sewage being settled to the bottom of said clarification chamber, means for discharging clarified liquid from said clarification chamber into said chlorine contact chamber for treatment therein by chlorine, means for discharging chlorinated effluent liquid from said chlorine chamber, means including an air pump for removing settled solid matter from said clarification chamber, distribution means connected with said air pump for distributing and discharging said solid matter into said digestion chambers and said stabilization chamber, and means for discharging solid matter from said stabilization chamber into said aeration chamber for mixing with said influent sewage.

5. Apparatus for treating sewage comprising, in combination, first, second, and third substantially cylindrical and concentric tanks, said tanks being arranged to provide a single unitary structure for the complete treatment of sewage by the activated sludge process, means dividing the volume of said first tank into at least a digestion and a chlorine contact chamber, means dividing the volume of said second tank into a stabilization chamber and an aeration chamber, the volume of said third tank providing a clarification chamber, means for supplying influent sewage to said aeration chamber, means for discharging sewage from said aeration chamber to said clarification chamber, means for discharging liquid from said clarification chamber into said chlorine contact chamber, means for discharging effluent liquid from said chlorine chamber, means for removing solid matter from said clarification chamber, means for distributing and discharging said solid matter into said digestion chamber and said stabilization chamber, and means for discharging matter from said stabilization chamber into said aeration chamber for mixing with said influent sewage.

References Cited in the file of this patent

UNITED STATES PATENTS

| | | |
|---|---|---|
| 1,996,325 | Cox | Apr. 2, 1935 |
| 2,013,577 | Pardee | Sept. 3, 1935 |
| 2,027,370 | Currie | Jan. 14, 1936 |
| 2,228,017 | Pecker | Jan. 7, 1941 |
| 2,233,218 | Moore | Feb. 25, 1941 |
| 2,337,507 | Thayer | Dec. 21, 1943 |
| 2,430,519 | Mallory | Nov. 11, 1947 |